United States Patent [19]

Bosshard

[11] 4,144,456

[45] Mar. 13, 1979

[54] APPARATUS FOR IRRADIATING A FLOWABLE SUBSTANCE

[75] Inventor: Ernst Bosshard, Winterthur, Switzerland

[73] Assignee: Sulzer Brothers Ltd., Winterthur, Switzerland

[21] Appl. No.: 722,093

[22] Filed: Sep. 10, 1976

[30] Foreign Application Priority Data

Sep. 12, 1975 [CH] Switzerland .................. 11865/75

[51] Int. Cl.² ........................................... G01N 21/26
[52] U.S. Cl. ................................ 250/437; 250/432 R; 250/436
[58] Field of Search ................... 250/432 R, 436, 435, 250/506, 507; 176/87, DIG. 2

[56] References Cited

U.S. PATENT DOCUMENTS

| | | | |
|---|---|---|---|
| 3,889,123 | 6/1975 | Bosshard | 250/436 |
| 3,934,152 | 1/1976 | Alleaume | 250/506 |
| 3,952,202 | 4/1976 | Bosshard | 250/432 R |
| 3,965,359 | 6/1976 | Bosshard | 250/432 R |

Primary Examiner—Alfred E. Smith
Assistant Examiner—B. C. Anderson
Attorney, Agent, or Firm—Kenyon & Kenyon, Reilly, Carr & Chapin

[57] ABSTRACT

The apparatus is provided with a screening chamber filled with a radiation-screening liquid above the irradiation chamber in which a tubular radiation source carrier is mounted. The screening chamber is sealed off from the irradiation chamber while orifices are formed in the support member of the carrier to permit loading and unloading of the carrier with the radiation sources. These sources may be stored in a pit adjacent the irradiation chamber and submerged in the screening liquid.

8 Claims, 3 Drawing Figures

APPARATUS FOR IRRADIATING A FLOWABLE SUBSTANCE

This invention relates to an apparatus for irradiating a flowable substance.

Heretofore, various types of structures have been known for irradiating flowable substances, such as clarified sludge, by means of radioactive radiation sources. One such structure, which is further described in German Offenlegungsschrift No. 2,332,210, has an irradiation chamber flowed through by the substance and a hollow cylindrical radiation source carrier in the chamber which has radiation sources disposed along generatrices. A means is also provided to circulate the substance so that the substance contacts the source carrier inner wall and outer wall alternately. The source carrier is also carried on a wall of the irradiation chamber via a support member. In addition, a screening or shielding cover is provided to screen the radiation source carrier from the outside environment.

However, a disadvantage of this known apparatus is that the screening or shielding cover is heavy and a correspondingly heavy-duty lifting tackle is needed to raise and lower the cover. Also, a cooling water circuit and circulating pump are required to cool the radiation sources.

Accordingly, it is an object of the invention to provide an irradiation apparatus which does not require any screening or shielding cover.

It is another object of the invention to provide an irradiation apparatus for clarified sludge which is relatively simple to operate and maintain.

It is another object of the invention to provide an irradiation apparatus which requires a light lifting tackle in order to load and unload radiation sources in a source carrier within the apparatus.

It is another object of the invention to eliminate the need for a separate cooling-water circuit in an irradiation apparatus of the above type.

Briefly, the invention provides an irradiation apparatus for irradiating a flow substance which uses a chamber filled with a radiation-screening or shielding liquid to shield an irradiation chamber. To this end, the apparatus includes a wall which defines an irradiation chamber for the flowable substance, a hollow cylindrical radiation source carrier disposed within the chamber, a support member secured to the carrier and mounted on the chamber wall to support the carrier on the wall and a plurality of radioactive radiation sources in the carrier. In addition, a means is provided for circulating the flowable substance within the chamber consecutively over the inner and outer wall surfaces of the carrier. The shielding chamber is disposed above the support member and is sealed from the irradiation chamber. Also, a plurality of orifices are formed in the support member to communicate the shielding chamber with the interior of the carrier to permit loading and unloading of the radiation sources and to permit circulation of the shielding liquid as a coolant in the carrier.

The apparatus has the further advantage of simplifying manipulation of the radiation sources and of reducing the weight and cost of the source caskets used to supply the radiation sources. Also, sources can be changed with the plant in operation.

Advantageously, the shielding chamber widens on one side and is formed in the widened part with a pit for the storage of radiation sources and their caskets. Large caskets can therefore be used.

Advantageously, the means for circulating the flowable substance is a concentrate pump having a rotor which extends into the source carrier. The use of a concentrate pump ensures gentle treatment of the circulated substance, with less abrasion of individual particles so that the substance sticks less.

The source carrier can have an insert on the inflow side of the concentrate pump which considerably restricts the flow cross-section, thus ensuring advantageous inflow conditions.

In order to allow rapid discharge of the irradiated material, the bottom of the irradiation chamber can be inclined towards one side where a discharge or draining valve is disposed. The adjacent end of the source carrier is bevelled correspondingly. Also, a discharge valve lid of the valve can be guided in a tube which extends through the apparatus to the outside where the lid can be connected to a servomotor.

The support member can be a tubular member which extends coaxially of the source carrier. In this case, the carrier has passages near the support member which are adapted to provide flow connections for the substance between the interior and the exterior of the source carrier. Preferably, if the material to be irradiated contains particles which are of considerably lower specific weight than the average for the substance, the wall of the irradiation chamber is rounded near the passages.

These and other objects and advantages of the invention will become more apparent from the following detailed description and appended claims taken in conjunction with the accompanying drawings in which:

Figure 1:
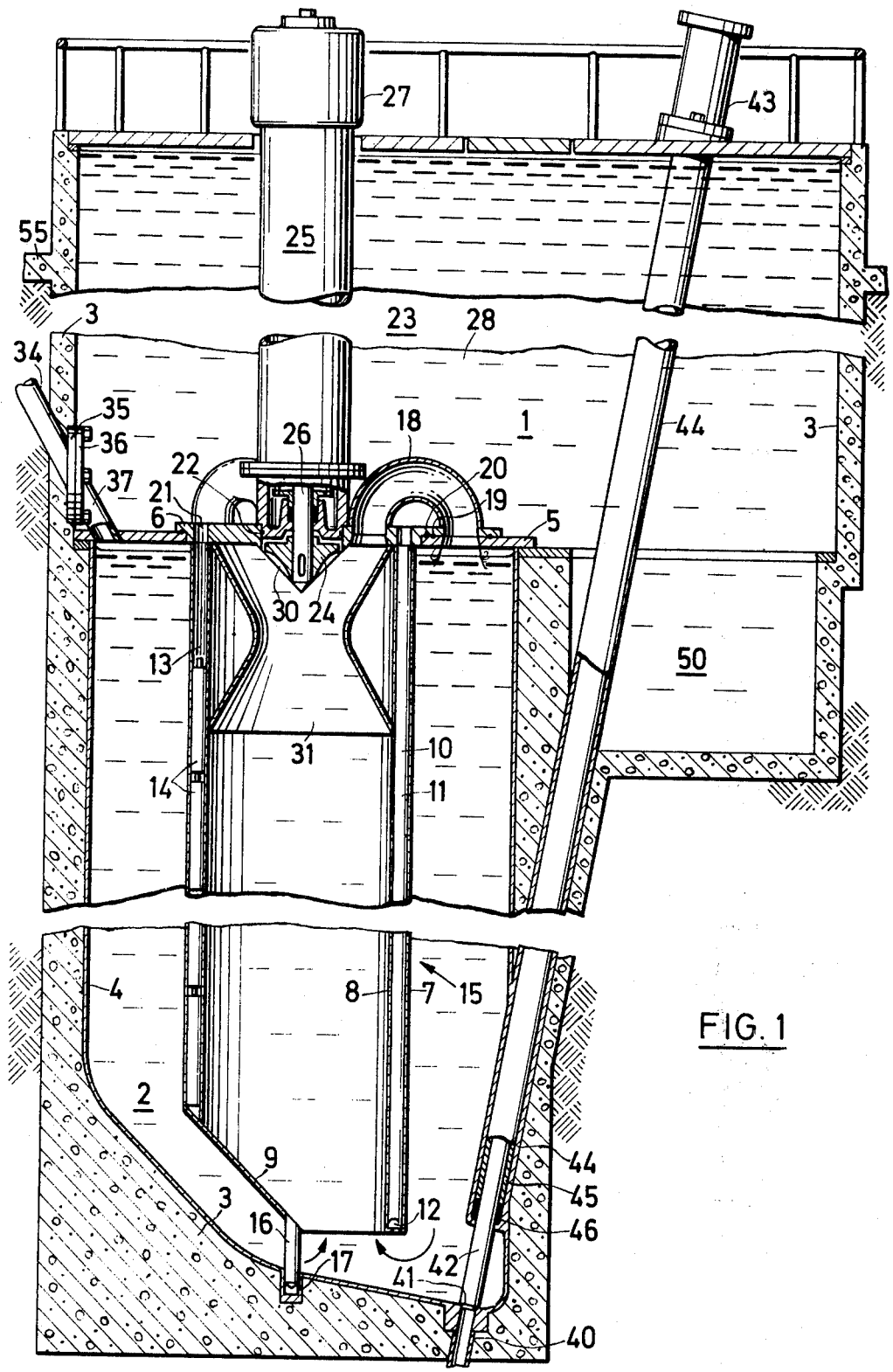
FIG. 1 illustrates a vertical sectional view through an apparatus according to the invention.

Referring to FIG. 1, the irradiation apparatus is defined by a shaft 1 and has a substantially circular cylindrical irradiation chamber 2 disposed therein on a vertical axis. As shown, the shaft 1 and the chamber 2 have concrete walls 3. Also, the wall which defines the chamber 2 has a lining 4 made of non-rusting steel plate. At the top edge, the chamber 2 has a support member in the form of an annular member 5 made of steel sheet or plate. A cover 6 is centered in the orifice of member 5 and engages the member 5 by way of a lip. The cover 6, in cross-section, substantially resembles a rounded triangle.

A radiation source carrier 15 is secured to the member 5 via the cover 6 so as to be mounted on the wall of the chamber 2 to depend into the chamber 2. The carrier includes a pair of tubes 7, 8 which define inner and outer wall surfaces as well as an interior annular space for receiving radiation sources. These tubes 7, 8 are welded coaxially to the cover 6 and at their bottom ends are cut with a bevel on one side. The bottom edges of the two tubes 7, 8 are interconnected in sealing-tight manner by an end member 9 which extends on the bevelled side as far as the axis of the support member 5. The annular space between tubes 7, 8 is subdivided into a number of segmental cells 13 by radially projecting metal members 11, gaps 12 being left at the base. Most of the cells 13 receive radioactive radiation sources 14 such as cobalt-60 rods.

The carrier 15 also has a spur 16 on the end member 9 which engages in a centering bore 17 in the chamber 2.

Three semicircular members 18 which extend in vertical radial planes are welded in the cover 6. These members 18 and the member 5 are formed with apertures in correspondence to the entries and exits of the members 18. The cover 6 is formed on the lipped side, around the three apertures, with one undercut groove 19 each and, around the projecting lip, with a groove 20, the grooves 19, 20 receiving ring seals. The cells 13 are accessible through the cover 6 by way of orifices 21.

A means is provided for circulating a flowable substance in the chamber 2 consecutively over the inner and outer wall surfaces of the carrier 15. To this end, the means includes a tube 25 which is disposed on the cover 6 in a bore 22 and is rigidly connected to the cover 6. This tube 25 carries a sludge pump rotor 24 which is driven by a motor 27 via a shaft 26. The sludge pump rotor 24 is conical and is formed with segmental recesses 30 to accelerate the flowable substance and applies a very reduced mechanical action to the substance to be irradiated so as not to abrade particles present therein.

A double-conical inflow part or insert 31 is located on the inflow side to provide advantageous inflow conditions for the rotor 24 by restricting the flow cross-section. The support member 5 serves as a partition between the chamber 2 and a screening or shielding chamber 23 filled with a radiation-screening liquid, i.e. water 28 to serve as a radiation shield. The annular interior space 10 of the carrier 15 fills up with water because of the presence of the passages 21 in cover 6.

The substance to be irradiated is supplied through a supply duct 34 which terminates flush with the wall of the chamber 2 in a flange 35. A matching flange 36 is secured to the flange 35 and a tubular member 37 welded at an inclination in the support member 5, extends to the chamber 2.

A discharge or drain pipe 40 is cast into the concrete base of the chamber 2. This pipe 40 is connected to the lining 4 and forms a valve seat at the level of the concrete base. The valve seat 41 cooperates with a valve lid 42 operated by a servomotor 43 to form a drain valve. The lid 42 is disposed in a tube 44 which is welded in sealing-tight manner to the lining 4 and which terminates short of the bottom. A sleeve 45 is disposed between the lid 42 and the tube and has a bottom end face which compresses a packing 46 disposed between the foreshortened part of the tube 44 and the end face of the sleeve 45. A pit 50 serving for temporary storage of the sources is also excavated from the shaft 1 and is disposed adjacent the irradiation chamber 2 submerged in the water 28.

The apparatus operates as follows:

To load the sources on to the source carrier 15, a casket containing radiation sources is lowered into the pit 50 and opened by means of a manipulator (not shown). The water layer 28 above provides complete shielding of the manipulation operator, who stands on a platform 55. The sources are removed from the casket and placed in the cells 13 by means of manipulators. The rotor 24 is then started, and through the agency of the rotating rotor 24, the material which has already been introduced through the duct 34 into the chamber 2 is sucked from below and ejected through the three semicircular members 18 into the annular chamber outside the outer tube 7. The substance then returns to the central chamber of the source carrier 15. Gases evolved during irradiation are removed through duct 34.

Upon completion of irradiation, the lid 42 is lifted by means of the servomotor 43 so that the sludge discharges through the discharge pipe 40. If required, the apparatus is scavenged by means which are not shown. After closure of the discharge exit, fresh material for irradiation is introduced through the duct 34 and the irradiation process restarts.

The vertical cells 13 disposed below the members 18 which do not receive radiation sources 14 serve as downpipes for water which is present in the shaft 1 and which is distributed horizontally at the base of the source carrier 15 through the gaps 12 and which rises through the occupied cells, while cooling the heat-yielding radiation sources 14, to reach the water chamber 23.

Figure 2:
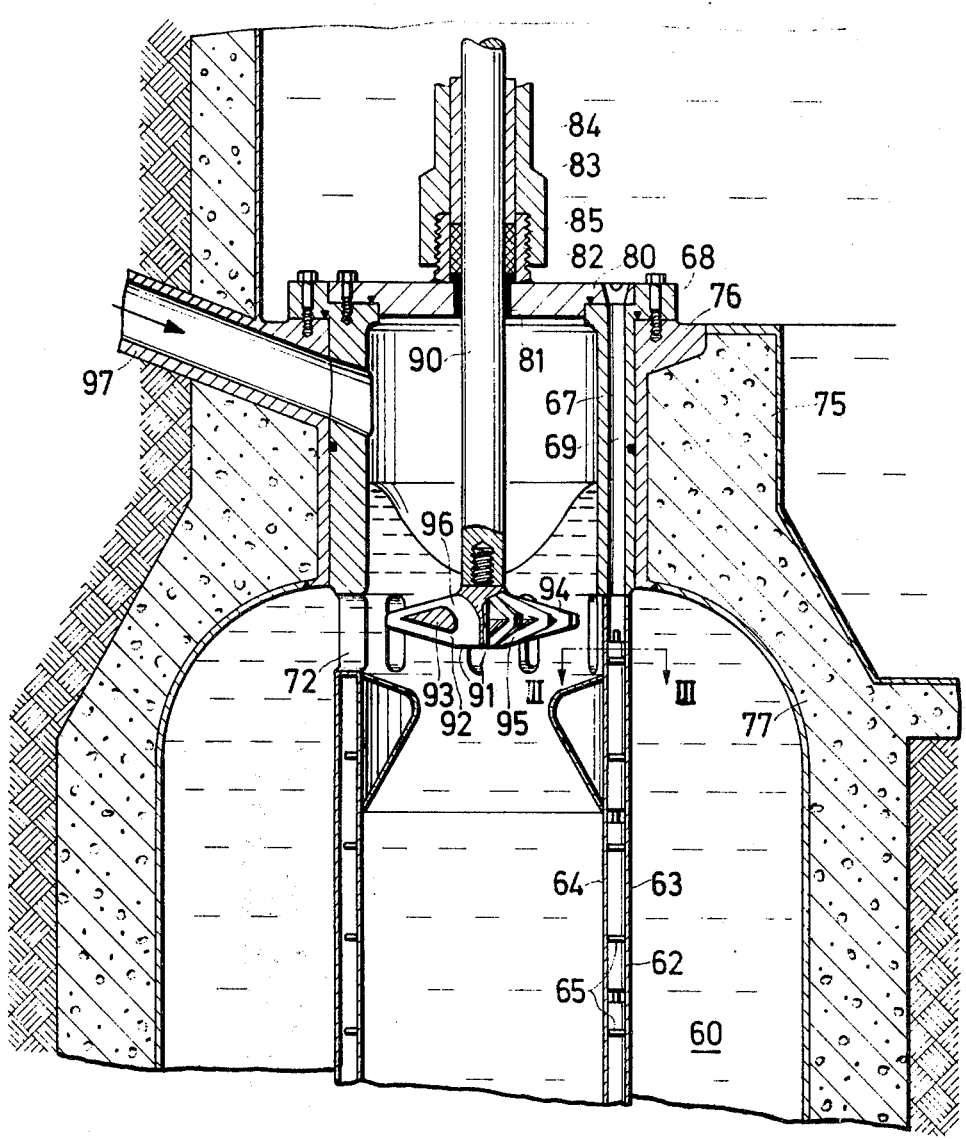
FIG. 2 illustrates a partial vertical sectional view through another embodiment of the invention.
Figure 3:
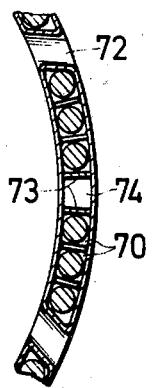
FIG. 3 illustrates a view taken on line III-III of FIG. 2.

Referring to FIG. 2, the irradiation apparatus can be adapted for cases where the sludge for irradiation contains particles whose specific weight is considerably less than the average for the whole body of sludge, so that there is a risk of the particles floating on top of the sludge and therefore not being irradiated adequately. To ensure that the particles do not thus float, the top region of the irradiation-chamber part which follows the pump is of relatively small volume and is flowed through relatively intensively.

As shown in FIG. 2, the irradiation chamber 60 is reduced at the top to a diameter corresponding to the outside diameter of a radiation source carrier 62. The carrier 62 mainly comprises an outer tube 63 and an inner tube 64 spaced apart by spacer tubes 65 which also act as guides for the radiation sources. The tubes 63, 64 are welded to a support tube 67 which has a flange 68. The support tube 67 extends through a cover 75 of the chamber 60 and rests by way of flange 68 on a cylindrical insert 76 in the ceiling or roof 75. The support tube 67 is formed with axial passages 69 which are in alignment with source-carrier chambers 70 bounded by the spacer tube 65 and through which the sources can be loaded and unloaded. The source carrier 62 is formed near the tube 67 and below the insert 76 with apertures 72 which extend at an incline to the radius and through which the clarified sludge is circulated.

Vertical passages 74 are disposed in the source carrier 62 in the center between every two orifices 72 and each is bounded by two radial partitions 73. These faller passages 74 also communicate with a passage 69 in the tube 67.

A cover 80 is let into the flange 68, carries a bearing bush or liner 81 in a central bore and communicates via a spigot 82 with a guide tube 83. A tubular gland 84 is disposed in the guide tube 83 and presses on a resilient packing or gland material 85. A shaft 90 is mounted in the bush 81 and packing 85 and carries a sludge pump rotor 91. The rotor 91 comprises a number of radial vanes 92 through which an annular body of rotation 93 so extends to form top flow passages 94, bottom flow passages 95 and axial flow passages 96. Most of the circulated sludge is conveyed on the underside of the sludge pump rotor 91. A small proportion flows through the passages 96 into the region above the rotor 91, so that the sludge in such region also experiences continuous circulation. The clarified sludge is supplied to the irradiation chamber 60 by way of a feed tube 97 which extends to inside the support tube 67. The feed tube 97 also serves for venting.

What is claimed is:

1. An apparatus for radioactively irradiating a flowable substance comprising:
   a wall defining an irradiation chamber for the flowable substance;
   a hollow cylindrical radiation source carrier disposed within said chamber, said carrier having an inner wall surface and an outer wall surface defining an interior annular space;
   a support member secured to said carrier and mounted on said wall to support said carrier on said wall;
   a plurality of radioactive radiation sources disposed in said interior annular space of said carrier in parallel relation to the longitudinal axis of said annular space;
   means for circulating the flowable substance within said chamber consecutively over said inner and outer wall surfaces of said carrier;
   a chamber above said support member filled with a radiation-shielding liquid, said shielding chamber being sealed from said irradiation chamber, and
   a plurality of orifices in said support member communicating said shielding chamber with said interior annular space of said carrier whereby said liquid fills said annular space and cools said radiation sources therein.

2. An apparatus as set forth in claim 1 wherein said shielding chamber has a widened portion including a pit adjacent said irradiation chamber for storing radiation sources therein.

3. An apparatus as set forth in claim 1 wherein said means for circulating is a concentrate pump extending into said carrier within said inner wall surface.

4. An apparatus as set forth in claim 3 which further comprises an insert within said carrier on an inflow side of said pump for restricting the flow cross-section of the interior of said carrier thereat.

5. An apparatus as set forth in claim 1 wherein said irradiation chamber has an inclined bottom and said carrier is bevelled opposite said inclined bottom and which further comprises a drain valve in a lower end of said bottom.

6. An apparatus as set forth in claim 5 wherein said valve has a discharge valve lid for selectively opening and closing said valve and which further comprises a tube extending through said wall and said shielding chamber and having said valve lid slidably mounted therein and a servomotor connected to said valve lid at an end of said tube for moving said valve lid.

7. An apparatus as set forth in claim 1 wherein said support member is a tubular member extending coaxially of said carrier and which further comprises a plurality of passages in said tubular member to communicate the interior of said carrier with the exterior thereof.

8. An apparatus as set forth in claim 7 wherein said wall is rounded near said passages.

* * * * *